INVENTOR
WILLIAM F. GALEY

ATTORNEYS

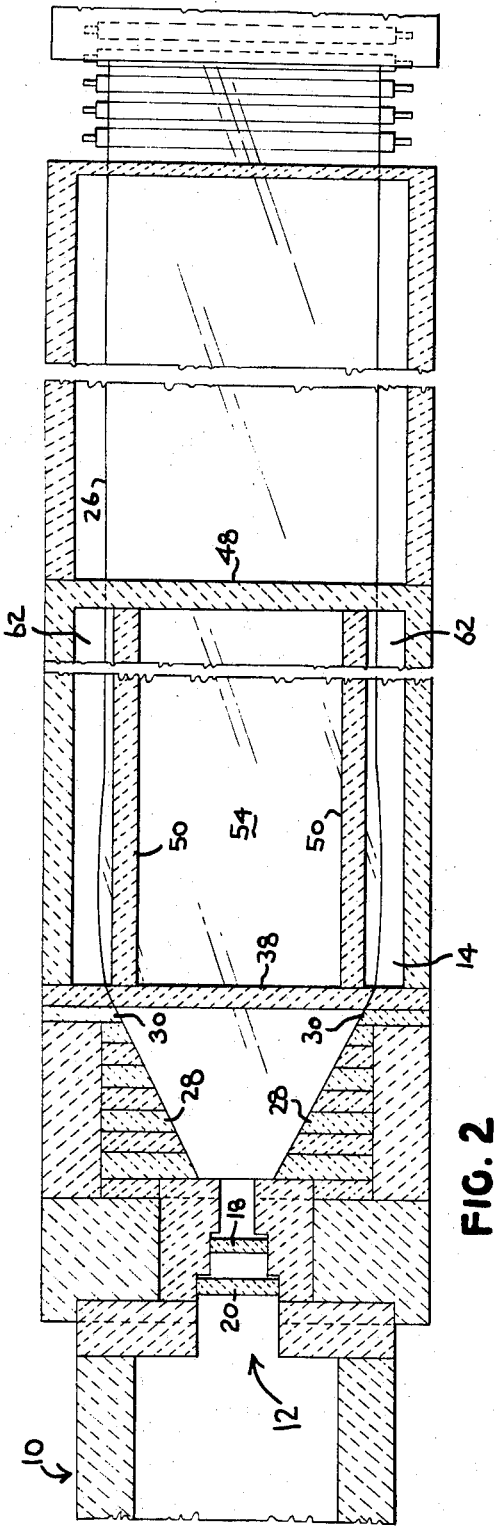
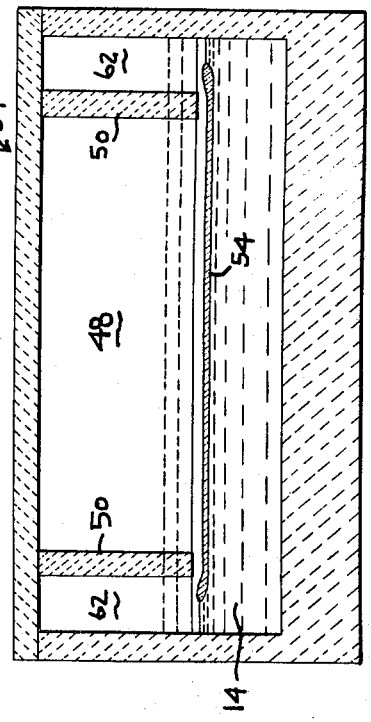

United States Patent Office 3,432,283
Patented Mar. 11, 1969

3,432,283
PROCESS FOR MANUFACTURE OF GLASS UTILIZING GAS PRESSURE FOR GLASS SIZING
William F. Galey, Saxonburg, Pa., assignor to PPG Industries, Inc., a corporation of Pennsylvania
Filed July 30, 1965, Ser. No. 475,964
U.S. Cl. 65—99                                  2 Claims
Int. Cl. C03c 23/00, 19/00

ABSTRACT OF THE DISCLOSURE

Molten glas is deposited on a liquid and is confined at its edges. A fluid pressure is applied to the confined glass which is different from a fluid pressure on the liquid outside of and in contact with molten glass on a different portion of the liquid. The confined glass is thus sized to thickness, and is then discharged from confinement, after which it is advanced along the liquid. The thickness of the advancing glass is maintained. The advancing glass is cooled to set the thickness and is then removed from the liquid.

This invention relates to the manufacture of flat glass and particularly to a method and apparatus for producing flat glass by floating the glass on a liquid having a density greater than that of the glass.

It has been heretofore proposed to produce flat glass by floating the glass on the surface of a bath of liquid, such as molten tin. Such process is known as the "Float" process and produces a product having fire-finished surfaces or surfaces closely approaching fire-finished surfaces, known as "Float" glass. Little, if any, abrasive surfacing is required to produce a quality product.

When glass of the usual soda-lime-silica composition is floated on a bath of molten tin or an alloy containing a major portion of tin, the resultant glass, if permitted to flow unhindered and to an equilibrium thickness, so that the surfaces are plane and parallel, will be approximately one-fourth inch in thickness. Glass of this thickness, known as the equilibrium thickness, is usable in the mirror trade but is undesirable in other usages where thinner glass is desired. For example, automobile windshields are generally constructed of a pair of one-eighth inch lites separated and bonded to one another by a plastic interlayer. Automotive side and back lites are desired in thicknesses of three-sixteenths inch or less. As glass technology improves, the desirability of using thinner but strength-increased glass increases.

In the usual float glass manufacture, molten glass is deposited, from a spout, directly onto the surface of a bath of molten tin and spreads out in somewhat circular fashion having a dimension transverse to the tank far in excess of the width of the ribbon being produced, and while thin glass, i.e., less than equilibrium thickness, can be produced, it is now commercially produced by an attenuation process, wherein the edges of the glass ribbon are gripped by gripper rolls and the ribbon is withdrawn at a rate in excess of that normally used. Attenuation produces glass having defects because of unequal cooling transverse to the direction of glass movement, and, also produces a ribbon of less width than normally produced. Thus, even with an increase in ribbon speed, the throughput of the system is generally lowered, so that less square footage of glass is produced. Increased speeds of withdrawal lower the length of time the glass is on the liquid, i.e., the residence time, and thus can result in poor surface quality glass because basically, the float process is a surfacing process requiring residence time for producing surface quality glass. Regardless of the thickness of the ribbon or its width, the ribbon has a tendency to "snake," i.e., move from its desired path as it moves along the metal bath. This leads to an unstable operation.

In the copending application of Edmund R. Michalik, Ser. No. 188,664, filed Apr. 19, 1962, entitled, "Method of Manufacture of Glass" (now abandoned), there is described and claimed a method for producing glass supported on a liquid bath of thickness different from the usual equilibrium thickness. To accomplish this, a body of molten glass is supported on a portion of the surface of a body of liquid, such as molten tin, and a pressure is applied to a central area of the glass which is different from the pressure on the tin at an edge of the glass in contact with the glass. When the pressure on the glass is above that on the tin, a glass of a thickness less than the usual equilibrium thickness is produced.

The present invention is an improvement over the last described method. Glass, from the melting tank, is delivered onto the surface of molten tin and between a pair of diverging walls where it is sized to the desired thickness or to a thickness approaching the ultimate thickness and is discharged at a width which ultimately will become its final width. By sizing the glass between the diverging walls, hereinafter also referred to as a "restrictor" region, it is possible to materially shorten the production line because the glass ribbon is presented to the major portion of the apparatus at the desired width and thickness. The only time required before removal from the bath is that time required for the leveling-out or surfacing process which requires residence time on the bath, and also temperature control of the ribbon. Stated somewhat differently, when a given volume of glass is delivered onto molten tin, so as to move at a substantially constant velocity at its central portion along the tin bath, the mass of glass will, after a period of time, decay to its equilibrium thickness. When pressure is applied to size the glass, maintaining a substantially constant velocity at its central portion, the glass becomes sized to its equilibrium thickness or to a less thickness, in a much reduced period of time. Thus, a pressurized restrictor region as being described herein can be used to change the rate of decay of a mass of glass delivered onto the surface of a bath of molten tin.

The present invention has certain advantages over that process of producing different than equilibrium glass wherein the glass is preformed by forming rolls and thereafter deposited on the liquid bath. Forming rolls generally tend to chill the glass, requiring additional heating for the surfacing procedure, and also are usually knurled, so as to leave a pattern impressed on the glass. To produce a quality surfaced product, the knurled pattern must be removed, requiring more residence time on the liquid bath.

The present invention materially improves the stability of the float process, because the diverging walls anchor the ribbon and determine, substantially, the ultimate ribbon width, which results in the elimination of or material reduction in snaking of the ribbon. Moreover, the usual amount of spread of the glass deposited on the bath in the usual float process is reduced, so that no special tank configuration is required as would be required in the usual process to produce a certain width ribbon. Even with some spreading of the glass on the bath, the diverging walls generally determine the ultimate ribbon width of the glass to be produced.

Further advantages will become apparent from the following description when taken with the accompanying drawings, in which:

FIG. 2 is a longitudinal sectional view taken on line 2—2 of FIG. 1; and

FIG. 3 is a sectional view taken on line 3—3 of FIG. 1 showing details of the apparatus.

Figure 1:
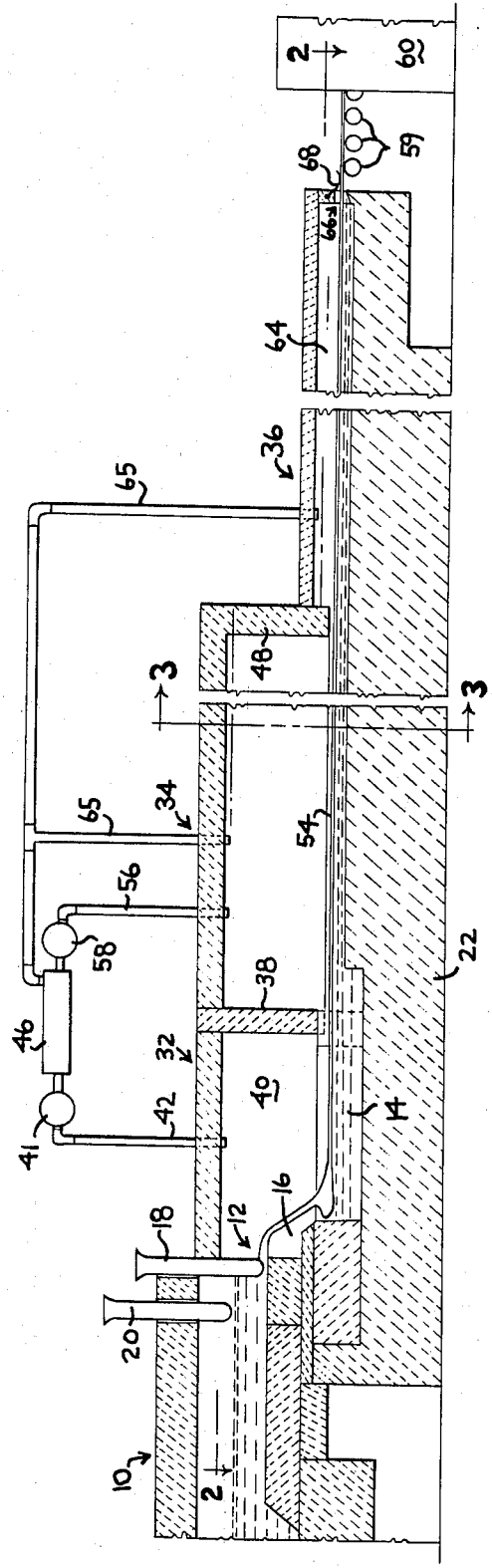
FIG. 1 is a plan view of an apparatus for performing the process of this invention.

Referring now to the drawings, there is illustrated the feeding end of a glass melting tank, generally identified as 10, in which glass batch materials are fed, melted and refined and from which glass is delivered through a neck 12 onto the surface of a pool of liquid 14, such as molten tin, having a density greater than that of the glass. The discharge of glass over a spout 16 in the neck is regulated by a tweel 18 and may be completely stopped by a tweel 20. Both tweels 18 and 20 are vertically adjustable.

The pool of liquid 14 is contained in a tank 22 and is maintained as a liquid by various heaters which are not shwn, but which are conventional in nature. The glass flows from the spout 16 onto the liquid 14 as a supply mass of glass from which a glass ribbon 26 is evolved. The glass is initially discharged onto the liquid between a pair of diverging refractory walls 28 in what is termed a restrictor region. The downstream terminus of the restrictor walls 28 are known as "kiss-off" blocks and are identified as 30. The walls 28 of the restrictor may be made of a refractory material which will be wet by the glass. The kiss-off blocks 30 are constructed of a refractory material, which may be graphite. The width of the kiss-off blocks 30 determine, substantially the ultimate width of the final or finished ribbon of glass, although the glass of the ribbon may widen or spread immediately after discharge from the restrictor region and the kiss-off blocks, but will, if it does widen, shortly thereafter narrow to substantialy that width between the kiss-off blocks.

The tank 22 for the liquid bath 14 is preferably constructed to include a first portion 32 over the restrictor region, a second portion 34 and a third portion 36, the first and third portions being adjacent the entrance and exit ends, respectively, of the tank 22.

The first portion 32 of the tank 22 is separated from the melting tank by the tweels 18 and 20, and especially the tweel 18 which extends onto the glass, and is separated from the second part 34 by a transverse wall 38 which extends from the roof to a location just above the glass. The part 32 is thus a chamber, identified as chamber 40 into which a gas under pressure may be introduced by means of one or more inlet pipes 42. Pumping means 44 and a gas supply 46 are also provided.

As will be noted (see especially FIG. 2), the tank 22 is wider than the distance between the kiss-off blocks 30 and that the second part 34 of the tank 22 is separated from the third part 36 of the tank 22 by a transverse wall 48 which extends from the roof to a position just above the glass 26, much in the same manner as wall 38. There are also longitudinal walls 50 extending from locations just above the glass and between the walls 38 and 48 inwardly of the side walls of the tank 22. The walls 50 are hung from the roof of the tank 22. Thus, the walls 38, 48, 50 and 50 define a second chamber 54 into which a pressurized gas may be fed by means of a pipe 56 and a pump 58 from the supply 46.

The third part 36 is the exit end of the tank 22 and terminates with an exit opening 56 through which the ribbon of glass 26 passes. The tractive force for moving the glass ribbon along the liquid bath is provided by a series of take-out rolls 59 which convey the glass into an annealing lehr 60, also having a series of traction rolls therein.

Gas from the source 46 is supplied to the chambers 62, 62, defined by the tank side walls and the walls 50, and to the chamber 64 defined by the third part 36 of the tank 22 by pipes 65. The gas supplied to the chambers 40, 54, 62, 62 and 64 provides a protective atmosphere within the tank 22, so as to substantially eliminate oxidation of the liquid of the bath 14. Additionally, the gas supplied to the chambers 40 and 54 is under pressure for purposes to be described.

Because the gas is supplied under pressure to the chambers 40 and 54 and thus is at a different pressure from that supplied to chambers 62, 62 and 64, seal means are preferably provided which are associated with the walls 38, 48, 50 and 50. The seal means may be constructed in accordance with the teaching in the copending application of Edmund R. Michalik and George W. Misson, Ser. No. 191,833, filed May 2, 1962, entitled "Manufacture of Glass." Similar seal means may be provided at the exit 66 of the tank 22 so as to prevent the entrance of atmospheric air into the chamber 64. Additionally, a curtain 68 or a series of curtains may be used to reduce the flow of the protective atmosphere from the chamber 64.

As disclosed in the aforementioned application of Edmund R. Michalik, Ser. No. 188,664, a pressure applied to a central area of molten glass supported on a portion of a liquid bath, which pressure is different from that on the liquid bath outside of and in contact with the glass, will produce glass of a thickness differing from the equilibrium thickness, i.e., that thickness which will naturally be obtained when molten glass is supported on a portion of a liquid bath and permitted to spread unhindered. When the pressure on the central area of the glass is above that on the liquid, the glass will be at a thickness less than equilibrium thickness; when the pressure on the glass is less than that on the liquid, the glass will be at a thickness greater than equilibrium thickness.

In the aforesaid application of Edmund R. Michalik, the glass is sized as to thickness in a single pressure chamber, and such thickness is stabilized in that pressure chamber by permitting the glass to cool therein before being discharged therefrom. Of course, the glass must remain at the desired thickness while in molten state to level out, i.e., to achieve flat and parallel surfaces of the fire-finished variety. This requires a considerable length pressure chamber and considerable time. In the invention being described, the molten glass is formed into a ribbon and is presized as to ultimate width and to any desired thickness in the restrictor region and the presized ribbon is then advanced into and through a pressure chamber wherein the glass levels and becomes surfaced.

Generally, the glass ribbon discharging from the restrictor region and its chamber is presized to a desired thickness, which thickness is held and set as the glass moves through the pressure chamber. Because the glass is set when discharged from the pressure chamber, it can then be conveyed without pressure thereon to exit and into the annealing lehr. The glass may be sized to a thickness less than that ultimately desired in the restrictor chamber and then permitted to grow to the desired thickness in the pressure chamber. Also, the glass may be sized to a thickness in excess of equilibrium thickness in the process.

I claim:

1. In the float process of forming flat glass which includes the steps of depositing a mass of molten glass onto the surface of a liquid supporting bath and permitting the mass of molten glass to laterally spread unhindered on said bath, form a ribbon thereon, and be conveyed along the bath while in molten condition so as to level out and achieve substantially flat surfaces, after which the flat ribbon of glass is cooled and removed from the bath, the improvement which comprises, initially confining the mass of molten glass deposited on the bath, so as to hinder its lateral spread and to form a layer of said glass in a flowable state on said supporting bath in an initial zone which layer covers the bath within said initial zone, applying a gaseous pressure to the confined molten glass in a flowable state which gaseous pressure is different from a gaseous pressure on the supporting bath outside of and in contact with glass in molten and flowable condition supported on the bath to form a ribbon of glass from said mass, said gaseous pressure applied to said molten glass being sufficient to change the thickness dimension of said confined glass, discharging the formed ribbon from its confinement in said initial zone at a width provided by the terminus of said zone, advancing the discharged ribbon along the bath in a second zone while maintaining the width thereof, cooling the glass to set its width, and removing the cooled glass from the bath.

2. In the process of claim 1, the step of initially confining the mass of molten glass between walls which diverge in the direction of the advancing glass.

References Cited

UNITED STATES PATENTS 3,241,939 3/1966 Michalik.
3,305,339 2/1967 Plumat.

DONALL H. SYLVESTER, *Primary Examiner.*

E. R. FREEDMAN, *Assistant Examiner.*

U.S. Cl. X.R.

65—65